(12) United States Patent
Miyata et al.

(10) Patent No.: US 8,119,731 B2
(45) Date of Patent: Feb. 21, 2012

(54) WATER-BASED AMINO RESIN AND WATER-BASED THERMOSETTING RESIN COMPOSITION CONTAINING THE SAME

(75) Inventors: Gen Miyata, Ichihara (JP); Yoshitomo Saitou, Ichihara (JP); Sunao Maeda, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 308 days.

(21) Appl. No.: 12/449,215

(22) PCT Filed: Feb. 1, 2008

(86) PCT No.: PCT/JP2008/051684
§ 371 (c)(1),
(2), (4) Date: Jul. 29, 2009

(87) PCT Pub. No.: WO2008/096682
PCT Pub. Date: Aug. 14, 2008

(65) Prior Publication Data
US 2010/0056716 A1    Mar. 4, 2010

(30) Foreign Application Priority Data
Feb. 9, 2007   (JP) .................................. 2007-029888

(51) Int. Cl.
*C08L 61/22* (2006.01)
*C08G 12/06* (2006.01)

(52) U.S. Cl. ........................................ 524/597; 528/269
(58) Field of Classification Search ................... 524/597; 528/269
See application file for complete search history.

(56) References Cited

U.S. PATENT DOCUMENTS
2005/0131081 A1 * 6/2005 Ueno et al. ...................... 516/77

FOREIGN PATENT DOCUMENTS

| JP | 57-158218 | 9/1982 |
| JP | 60-231721 | 11/1985 |
| JP | 62-172078 | 7/1987 |
| JP | 3-21673 | 1/1991 |
| JP | 3-24170 | 2/1991 |
| JP | 6-145277 | 5/1994 |
| JP | 8-165408 | 6/1996 |
| JP | 2002-97243 | 4/2002 |

* cited by examiner

*Primary Examiner* — William Cheung
(74) *Attorney, Agent, or Firm* — Foley & Lardner LLP

(57) ABSTRACT

An object of the present invention is to provide a definitely novel water-based amino resin which is a condensation product of an amino compound (a) having no acid functional group, an amino compound having an acid functional group or an amide compound (b) having an acid functional group, formaldehyde (c) and an alcohol (d), wherein an acid functional group originating in the compound (b) is neutralized with a basic compound (e).

11 Claims, No Drawings

US 8,119,731 B2

WATER-BASED AMINO RESIN AND WATER-BASED THERMOSETTING RESIN COMPOSITION CONTAINING THE SAME

This application is a 371 of PCT/JP2008/051684 filed Feb. 1, 2008.

FIELD OF THE INVENTION

The present invention relates to a water-based amino formaldehyde resin (hereinafter abbreviated to a water-based amino resin) which is an amino resin provided with aqueous property and which can be applied to paints capable of forming coating films excellent in various physical properties such as a water resistance, a processability and a hardness, and to a water-based thermosetting resin composition containing the same. The water-based thermosetting resin composition can be used as a paint or a coating material which is principally painted or coated on home electric appliances, cars, cans and the like.

BACKGROUND OF THE INVENTION

Resin compositions in which an amino formaldehyde resin (hereinafter abbreviated to an amino resin) is used as a cross-linking agent (curing agent) have so far been known as a thermosetting paint composition. Paints comprising the above resin composition are diluted with an organic solvent and then used. In recent years, thermosetting paint compositions which can be diluted with water have actively been researched for the purpose of reducing organic solvents discharged in drying and baking of coated films from the viewpoints of air pollution and environmental protection.

In general, as a water-based thermosetting paint composition in which an amino resin is used as a cross-linking agent (curing agent), mention may be made of thermosetting paint compositions obtained by combining an amino resin which is alkyl-etherified by methanol with a resin (hereinafter abbreviated to a base resin) which has a water solubility or a water dispersibility and which produces a cross-linking reaction with an amino resin. However, the thermosetting paint compositions are slow in cross-linking reaction in thermosetting thereof, and coated films obtained therefrom tend to be inferior in a water resistance as compared with coated films formed from conventional paints diluted with an organic solvent.

On the other hand, mention may be made of thermosetting paint compositions obtained by combining an amino resin which is alkyl-etherified by an alcohol such as butanol (for example, a butylated melamine resin) with a base resin as well. They are inferior in a water reducibility, but a curing property thereof and a water resistance of coated films obtained by curing them are excellent, and therefore a technique in which they are applied to water-based paints is reported as well (patent documents 1 and 2). However, since a dispersant used for stably dispersing an amino resin poor in water-solubility in water has a high hydrophilicity, eventually, use of the amino resin which is alkyl-etherified by an alcohol such as butanol does not make it possible to completely improve a water resistance of the coated film.

The amino resin described above which is alkyl-etherified by methanol is designed so that a content ratio of a mononuclear body in which one melamine skeleton is contained in one molecule of the amino resin is as high as 50% or more for the purpose of exhibiting its water solubility. Accordingly, the amino resin involves a problem that a coated film prepared by curing it is inferior in mechanical physical properties to that prepared from a butylated melamine resin having a smaller content ratio of a mononuclear body.

Further, amino resins modified with high molecular hydrophilic compounds, such as modified amino resins having polyethylene glycol or polypropylene glycol skeleton have been reported as well (patent documents 3 and 4). However, involved therein as well is problems that the part of the amino resin skeleton excluding the polyethylene glycol or polypropylene glycol skeleton which is important for maintaining performances is reduced in a proportion in a molecule due to high molecular segments for providing a water base property such as polyethylene glycol and that the expected performances are less liable to be exerted.

In addition thereto, amino resins modified with 2,2-bis-(dimethylol)butanoic acid which is an oxycarboxylic acid and the like have been invented as well (patent document 5). However, in order to produce such amino resins, the reaction temperature has to be elevated up to 100° C. in introducing an acid functional group by hydroxyl group modification. Accordingly, involved therein is manufacturing problems that self cross-linking is liable to proceed when melamine which is an amino resin used particularly for water-based paints and which has three amino groups is used as a raw material and that it is difficult to obtain an amino resin having a desired molecular weight.

Patent document 1: Japanese Patent Application Laid-Open No. 1991-21673
Patent document 2: Japanese Patent Application Laid-Open No. 1991-24170
Patent document 3: Japanese Patent Application Laid-Open No. 2002-97243
Patent document 4: Japanese Patent Application Laid-Open No. 1994-145277
Patent document 5: Japanese Patent Application Laid-Open No. 1996-165408

DISCLOSURE OF THE INVENTION

An object of the present invention is to provide a definitely novel water-based amino resin improving the problem of a butylated amino resin which has excellent physical properties in a coated film but is less liable to be provided with a water base property as compared with a methylated amino resin and the problem of a methylated amino resin which is easy to be provided with a water base property but has inferior physical properties in a coated film as compared with a butylated amino resin.

Also, an object of the present invention is to provide a production process for a water-based amino resin in which a water-based amino resin having a desired molecular weight and being reduced in a variation of a molecular weight before and after introducing a functional group can be readily obtained while inhibiting self cross-linking of the amino resin itself, and to provide a water-based amino resin produced by the above production process.

Further, an object of the present invention is to provide a water-based thermosetting resin composition capable of being applied to paints which have a good storage stability and are excellent in a curing property and in which coated films obtainable therefrom are by no means inferior in a water resistance, a weather resistance and mechanical physical properties as compared with those provided by conventional organic-solvent-based paints.

Intensive researches conducted by the present inventors in order to solve the problems described above have resulted in finding that a water-based thermosetting resin composition which is well-improved in defects of conventional water-based thermosetting paint compositions is obtained by combining a water-soluble or water-dispersible base resin with a water-based amino resin obtained by condensing an amino compound (a) having no acid functional group, an amino compound having an acid functional group or an amide compound (b) having an acid functional group, formaldehyde (c) and an alcohol (d) under the presence of water (g) and neutralizing an acid functional group originating in the compound (b) of the obtained condensation product with a basic compound (e). Thus, they have come to complete the present invention.

That is, an essential of the present invention is:

a water-based amino resin which is a condensation product of an amino compound (a) having no acid functional group, an amino compound having an acid functional group or an amide compound (b) having an acid functional group, formaldehyde (c) and an alcohol (d) and in which an acid functional group originating in the compound (b) is neutralized with a basic compound (e).

The amino compound having an acid functional group or amide compound (b) having an acid functional group (hereinafter referred to merely as the compound (b)) has a high reactivity, and use thereof makes it possible to introduce an acid functional group into the amino resin at low temperature.

The water-based amino resin of the present invention has a weight average molecular weight of preferably 1200 to 10000. In the present specification, the weight average molecular weight means a weight average molecular weight relative to polystyrene standards measured by GPC (gel-permeation chromatography).

The water-based amino resin of the present invention can be produced by condensing an amino compound (a) having no acid functional group, an amino compound having an acid functional group or an amide compound (b) having an acid functional group, formaldehyde (c) and an alcohol (d) under the presence of water (g) and neutralizing an acid functional group originating in the compound (b) in a product (I) obtained by the above condensation with a basic compound (e).

The product (I) is preferably obtained by condensing the compound (a), the formaldehyde (c) and the alcohol (d) and condensing a product (II) obtained by the above condensation with the compound (b) under the presence of water (g).

As described above, use of the compound (b) makes it possible to introduce an acid functional group into the amino resin at low temperature to readily obtain the water-based amino resin having a desired molecular weight.

The product (II) described above is preferably condensed with the compound (b) at a reaction temperature of 50 to 60° C. under the presence of an alcohol (f) and water (g).

The water-based amino resin of the present invention can be produced as well by condensing the amino compound (a) having no acid functional group, a compound (h) obtained by neutralizing the amino compound having an acid functional group or amide compound (b) having an acid functional group with the basic compound (e), the formaldehyde (c) and the alcohol (d) under the presence of water (g).

Further, the water-based amino resin of the present invention can be produced as well by condensing the amino compound (a) having no acid functional group, the formaldehyde (c) and the alcohol (d) and condensing a product (III) obtained by the above condensation with the compound (h) obtained by neutralizing the amino compound having an acid functional group or amide compound (b) having an acid functional group with the basic compound (e) under the presence of water (g).

The product (III) is preferably condensed with the compound (h) at a reaction temperature of 50 to 60° C. under the presence of an alcohol (f) and water (g).

A water-based thermosetting resin composition comprising the water-based amino resin described above can be applied to paints which have a good storage stability and are excellent in a curing property and in which coated films obtainable therefrom are by no means inferior in a water resistance, a weather resistance and mechanical physical properties as compared with those provided by conventional organic-solvent-based paints. It can also be applied to various coating materials.

Advantages of the Invention

The water-based amino resin of the present invention has excellent water reducibility and can be used as a curing agent suitable for water-based paints since the amino compound having an acid functional group or amide compound (b) having an acid functional group is condensed therein.

The production process for a water-based amino resin according to the present invention is a process in which the compound (b) is employed as a raw material in an existing production process for amino resins. As described above, the compound (b) has a high reactivity, and use thereof makes it possible to introduce an acid functional group into the amino resin at low temperature, so that the water-based amino resin having a desired molecular weight can be readily obtained.

Also, the paint of the present invention comprises the water-based thermosetting resin composition comprising the water-based amino resin, and therefore a water resistance, a hardness, an adhesive property, a solvent resistance and the like of a coated film obtained by curing the paint are equal to those of existing butylated amino resins.

BEST MODE FOR CARRYING OUT THE INVENTION

The present invention shall be explained below in details, but the typical examples of the embodiment of the present invention are explained below and the present invention shall not be restricted to the contents thereof.

[Water-Based Amino Resin]

The water-based amino resin of the present invention is a water-based amino resin which is a condensation product of an amino compound (a) having no acid functional group, an amino compound having an acid functional group or an amide compound (b) having an acid functional group, formaldehyde (c) and an alcohol (d) and in which an acid functional group originating in the compound (b) is neutralized with a basic compound (e). The term "water-based" in the present invention means having a water solubility or a water dispersibility.

<(a) Amino Compound Having No Acid Functional Group>

The amino compound (a) having no acid functional group (hereinafter referred to merely as the compound (a)) is a compound which does not have an acid functional group and which has an amino group. Compounds having a triazine nucleus, urea and the like which are usually used as a raw material for amino resins can be used as the compound (a). The acid functional group includes, for example, a carboxylic acid group, a sulfonic acid group.

The number of an amino groups in the compound (a) is preferably 2 or more in order to enhance a cross-linking degree of the water-based amino resin of the present invention, and the compound (a) is more preferably a compound having a triazine nucleus.

The compounds having a triazine nucleus include melamine, benzoguanamine and the like, and melamine is preferred from the viewpoint of enhancing a cross-linking degree of the water-based amino resin of the present invention.

<(b) Amino Compound Having an Acid Functional Group or Amide Compound Having an Acid Functional Group>

The amino compound having an acid functional group or amide compound (b) having an acid functional group is used in order to provide the amino resin of the present invention with an aqueous property.

The specific examples of the compound (b) include amino acids such as glycine and alanine, o, m, p-aminobenzoic acids, o, m, p-aminomethylbenzoic acids, 3-aminopropionic acid, 4-aminobutanoic acid, DL-aminoisobutanoic acid, 4-aminocrotonic acid, 4-amino-3-hydroxybutanoic acid, glycyl glycine, aminomethanesulfonic acid, 2-aminoethanesulfonic acid, 3-aminopropanesulfonic acid, o, m, p-sulfanilic acids, 1-amino-4-naphthalenesulfonic acid and positional isomers thereof, oxamic acid, aminomalonate, succinamic amide, maleamate, o, m, p-phthalamidic acids, N-(2-acetamide)-2-aminoethanesulfonic acid and 12-aminododecanoic acid.

<(c) Formaldehyde>

The formaldehyde (c) used in the present invention may be either an aqueous solution or solid paraformaldehyde. Paraformaldehyde having an involatile content of 80% or more is preferred from the viewpoint of an economic efficiency.

<(d) Alcohol>

Alcohol represented by $C_nH_{2n+1}OH$ (n is an integer of 1 to 8) is usually used as the alcohol (d) which is the raw material for the water-based amino resin of the present invention. Its structure may be a linear or branched structure.

When an alcohol in which n is 9 or more is used, self cross-linking of the water-based amino resin is likely to proceed by heating in a step of removing a reaction solvent described later in the production process for the water-based amino resin. From the viewpoint of the economic efficiency and performance of the coated film, n is preferably an integer of 1 to 4. Further, a value of n is preferably smaller in order to enhance a hydrophilicity of the water-based amino resin obtained, and on the contrary, a value of n is preferably larger in order to enhance a hydrophobicity. The value of n is selected according to the form of paints for which the water-based thermosetting resin composition of the present invention is used and a desired compatibility of the water-based amino resin with the base resin.

The alcohols (d) used in the present invention include, for example, methanol, n-butanol, isobutanol, ethanol, propanol and isopropanol, and it may be a mixture thereof. The alcohol (d) is preferably n-butanol.

<(e) Basic Compound>

Immediately after condensing the alcohol (d) with the compound (b) in the production process of the water-based amino resin of the present invention, an obtained amino resin has an acid functional group originating in the compound (b), and therefore a liquid property thereof stays in an acidic state.

Self cross-linking reaction of the amino resin proceeds under an acidic condition, and the amino resin which produced a self cross-linking has a low storage stability. Accordingly, the amino resin staying in the acidic state, to be more specific, an acid functional group originating in the compound (b) of the amino resin staying in the acidic state has to be neutralized with the basic compound (e). In the present invention, the term "neutralization" means normal "a chemical step in which an acid and a base cancel out their own properties each other". Also, the term "an acid functional group originating in the compound (b) is neutralized with the basic compound (e)" described above does not necessarily mean neutralizing all acid functional groups originating in the compound (b), and the acid functional groups should be neutralized to such an extent that the self cross-linking reaction does not proceed.

Neutralization of the acid functional group with the basic compound (e) not only makes it possible to prevent self cross-linking reaction of the amino resin but also enhances the aqueous property of the amino resin, and therefore neutralization by the basic compound (e) contributes to controlling a polarity of the water-based amino resin of the present invention to a large extent.

Both of inorganic bases and organic bases can be used as the basic compound (e). The inorganic bases include, to be specific, hydroxides of alkali metals such as sodium hydroxide and potassium hydroxide and ammonia. The organic bases include, to be specific, alkanolamines such as monoethanolamine, dimethylethanolamine and triethanolamine and amines such as aminomorpholine.

[Production Process for Water-Based Amino Resin]

The production process for the water-based amino resin of the present invention is as follows. A reaction vessel is charged with the compound (a), the formaldehyde (c) and the alcohol (d) and heated up to a refluxing temperature of a reaction solvent to dissolve them, and then the three components are subjected to condensation reaction using acid as a catalyst to obtain an amino resin.

As the reaction solvent, mention may be made of general reaction solvents used for producing amino resins, for example, methanol, n-butanol, isobutanol, ethanol, propanol and isopropanol. The liquid components such as the reaction solvent and the alcohol (d) which remains without being reacted can be removed, if necessary, from the reaction solution by distillation operation after the synthetic reaction of the amino resin.

Both of organic acids and inorganic acids can be used as the acid described above. The organic acids include formic acid and oxalic acid, and the inorganic acids include phosphoric acid.

After the condensation reaction, the reaction solution is cooled down preferably to 50 to 60° C. The compound (b), an alcohol (f) and water (g) are added to the reaction solution to cause a condensation reaction with the amino resin.

The alcohol (f) is used in a step different from the that for the alcohol (d) in the production of the water-based amino resin of the present invention, and usually it is a compound which is newly added to the reaction solution separately from the alcohol (d). The alcohol (d) and the alcohol (f) may be either the same compound or different compounds. When the alcohol (d) and the alcohol (f) are the same compound, the alcohol (d) can be directly used as the alcohol (f) by controlling an amount of the alcohol (d) used in the aforementioned synthetic reaction of the amino resin, and in the case where distillation operation is carried out after the reaction, by controlling an amount of the alcohol (d) used in the synthetic reaction of the amino resin and a removing amount of the alcohol (d) in the distillation operation.

The alcohol (f) can be added before adding the compound (b) to the amino resin reaction solution or at the same time as adding the compound (b). In this case, "adding at the same time" shows both of a case where the individual raw materials are separately added at the same time and a case where the individual raw materials are mixed and added in a state of a solution or a slurry.

The compound (b) having a polarity is liable to be compatible with the amino resin by using the alcohol (f), and the reaction efficiently proceeds.

As the alcohol (f), mention may be made of low molecular alkyl alcohols having high affinity with water such as methanol, ethanol, 1-propanol and iso-propanol, ethylene glycol monoalkyl ethers such as methyl cellosolve, ethyl cellosolve and butyl cellosolve and diethylene glycol monoalkyl ethers such as methyl carbitol and ethyl carbitol. The alcohol (f) is preferably ethanol.

Next, with respect to water (g) described above, the compound (b) or the compound (h) described later is present in a solid state in the production process for the water-based amino resin of the present invention, and therefore it is less liable to be reacted with the amino resin. The compound (b) or the compound (h) shows a water solubility in many cases, and therefore addition of water (g) to the reaction solution containing the amino resin described above makes it possible to dissolve the compound (b) or the compound (h) to enhance the reaction efficiency.

The compound (b) or the compound (h) can be reacted with the amino resin without using the alcohol (f), but in such case, such an influence that time required for the reaction is extended is invited therein. On the other hand, water (g) is an essential component because it has an action of dissolving the compound (b) and the compound (h) which is a neutralization salt thereof.

As described above, the reaction solution is cooled down preferably to 50 to 60° C. after the condensation reaction for preparing the amino resin, and the compound (b), the alcohol (f) and water (g) are added to the reaction solution. Provided the reaction temperature in the above case is in a range of 50 to 60° C., the condensation reaction sufficiently proceeds to make it possible to introduce an acid functional group into the amino resin, and self condensation of the obtained water-based amino resin can be inhibited.

Consequently, according to the production process for the water-based amino resin of the present invention, the water-based amino resin having a desired molecular weight can be obtained, and disadvantages such as deficiency of mechanical physical properties of a coated film formed from a paint comprising a water-based thermosetting resin composition containing the water-based amino resin due to a too low molecular weight of the water-based amino resin, elevation in a viscosity of the paint which results in a reduction in the painting workability due to a too high molecular weight and damage of an appearance of the coated film due to a reduction in a smoothness of the coated film are very less liable to be caused.

The molar ratios of the respective components in condensing the compound (a), the compound (b), the formaldehyde (c) and the alcohol (d), assuming that a molar ratio of the compound (a) is set to 1.0, are as follows:
The compound (b) is usually 0.1 to 4.0, preferably 0.1 to 3.0 and more preferably 0.1 to 2.0,
the formaldehyde (c) is usually 3.0 to 7.0, preferably 4.0 to 7.0 and more preferably 4.0 to 6.5 and
the alcohol (d) is usually 4.0 to 10.0, preferably 5.0 to 9.0 and more preferably 5.0 to 7.0.

Condensing the above four components in the above reaction ratios and carrying out subsequent neutralization result in the water-based amino resin applicable to the water-based thermosetting resin composition capable of providing a coating film which is excellent in a water resistance, a weather resistance and mechanical physical properties.

The use amounts (molar ratio based on the compound (a)) of the alcohol (f) and water (g) assuming that a molar ratio of the compound (a) is set to 1.0 are as follows:
The alcohol (f) is usually 1.0 to 3.0, preferably 1.5 to 2.7 and more preferably 1.8 to 2.4 and
water (g) is usually 1.0 to 6.0, preferably 1.0 to 5.8 and more preferably 1.0 to 5.6.

After the condensation reaction of the amino resin with the compound (b), neutralization operation is further carried out with the basic compound (e), and the alcohol and water which remain excessively are partly removed by distillation operation under reduced pressure to control the involatile content, whereby the amino resin provided with aqueous properties, that is, the water-based amino resin can be obtained.

A use amount of the basic compound (e) is, assuming that a mole ratio of an acid functional group contained in the amino resin is set to 1.0, preferably 0.8 to 1.2 from the viewpoints of a water dispersibility and a stability of the water-based amino resin obtained. It is more preferably 0.9 to 1.1.

The compound (b) can be neutralized in advance with the basic compound (e) to prepare the compound (h) in which an acid functional group is neutralized, and then it can be condensed as well with the amino resin. In this case, a use amount of the basic compound (e) is, assuming that a molar ratio of an acid functional group of the compound (b) is set to 1.0, preferably 0.8 to 1.2. It is more preferably 0.9 to 1.1.

In order to control a molecular weight of the water-based amino resin and a degree of an alkyl etherification by the alcohol (d), a step of adding the compound (b) to the reaction vessel can be carried out as well during an alkyl etherification step.

A weight average molecular weight of the water-based amino resin of the present invention relative to polystyrene standards measured by GPC is usually 1200 to 10000, preferably 1500 to 7000. If the weight average molecular weight is too low, mechanical physical properties of a coating film obtained by curing the paint comprising the water-based thermosetting resin composition containing the water-based amino resin of the present invention are short in a certain case. If it is too large, cross-linking points in the coating film are reduced, and a viscosity of the water-based amino resin grows high, so that workability in preparing the paint and coating it is reduced, thereby a smoothness of the coating film is lowered to damage an appearance of the coating film in a certain case.

[Water-Based Thermosetting Resin Composition Comprising the Water-Based Amino Resin]

The water-based thermosetting resin composition of the present invention is a composition containing the water-based amino resin of the present invention as a principal component for a curing agent, and it comprises usually the curing agent and the base resin.

The curing agent comprises the water-based amino resin of the present invention as a principal component, and in addition thereto, it may contain a pigment, a dye, a leveling agent, a paint stability improving agent, a foaming inhibitor, a weather resistance improving agent, an anti-popping agent, an antioxidant and the like.

The base resin is a resin which produces a cross-linking reaction with the water-based amino resin and which has a water solubility or a water dispersibility, and the base resin includes single components such as a polyester resin, an acryl resin, an epoxy resin, an urethane resin and mixed and complexed resins comprising the above resins.

[Paint Comprising the Water-Based Thermosetting Resin Composition]

The paint of the present invention comprises the water-based thermosetting resin composition of the present invention, and the water-based thermosetting resin composition of the present invention itself can be used as the paint. Further, optional publicly known methods for improving a coating workability and a coating film by adding various additives for the purposes of improving a smoothness of a coating film surface, preventing foaming or the like can be applied to the paint of the present invention.

The above methods include, for example, a method in which BYK-380 and BYK-381 (acryl polymer base additives), BYK-348 (silicone base resin) or the like manufactured by BYK-Chemie GmbH are added for the purpose of improving a smoothness, and a method in which BYK-020 (modified polysiloxane copolymer), BYK-022 (silicone base resin) or the like manufactured by BYK-Chemie GmbH are added for the purpose of preventing foaming.

The paint of the present invention is used in a form in which it is dissolved or dispersed in water. It causes no problem to dissolve or disperse the paint in an organic solvent. However, the kind of the organic solvent and an addition amount thereof are preferably determined considering a solubility of the water-based amino resin of the present invention contained in the above paint, a coating method of the paint and an environment thereof, drying conditions of the coating film and the like.

As the organic solvent, mention may be made of water-soluble alcohols such as methanol, ethanol, n-propanol, isopropanol, furfuryl alcohol and tetrahydrofurfuryl alcohol; ethylene glycol and water-soluble ethylene glycol derivatives such as ethylene glycol, ethylene glycol monomethyl ether, ethylene glycol monomethyl ether acetate, ethylene glycol monoethyl ether, ethylene glycol monoisopropyl ether, ethylene glycol monobutyl ether, methoxymethoxyethanol and ethylene glycol monoacetate;
diethylene glycol, triethylene glycol and water-soluble derivatives of the respective glycols such as diethylene glycol, diethylene glycol monomethyl ether, diethylene glycol monoethyl ether, diethylene glycol monobutyl ether, diethylene glycol dimethyl ether, diethylene glycol methyl ethyl ether, triethylene glycol, triethylene glycol monomethyl ether and triethylene glycol monoethyl ether; and water-soluble polyhydric alcohols and derivatives thereof such as propylene glycol, propylene glycol monomethyl ether, propylene glycol monoethyl ether, dipropylene glycol, dipropylene glycol monomethyl ether, trimethylene glycol, glycerin, glyceryl monoacetate and glyceryl diacetate.

The other organic solvents include tetrahydrofuran, tetrahydropyran, acetone, diacetone alcohol, formamide, N,N-dimethylformamide, N-methyl2-pyrrolidone and the like.

[Coating Material Comprising the Water-Based Thermosetting Resin Composition]

As the coating material comprising the water-based thermosetting resin composition of the present invention, mention may be made of adhesive materials, molding materials and the like comprising the water-based thermosetting resin composition of the present invention. Various additives, for example, the additives such as the foaming inhibitor and the smoothness improving agent each described above can be added to the coating material comprising the water-based thermosetting resin composition of the present invention according to the uses of the coating material. Further, it causes no problem to add, if necessary, the organic solvents described above.

EXAMPLES

The present invention shall more specifically be explained below with reference to examples, comparative examples and a reference example. However, the present invention shall not be restricted to these examples. Units shown by "%" and "parts" are based on weight unless otherwise described.

A weight average molecular weight of resins obtained in the following production examples is a weight average molecular weight relative to polystyrene standards measured by GPC (gel permeation chromatography), and an involatile content was determined according to JIS K5407-4-3-1.

Production Example 1

Base Resin: Water-Based Acryl Resin A1

53 Parts of styrene, 13 parts of methyl methacrylate, 20 parts of ethyl acrylate, 7 parts of β-hydroxyethyl acrylate, 7 parts of methacrylic acid and 0.5 parts of benzoyl peroxide were added dropwise in 4 hours to 67 parts of ethylene glycol monoisopropyl ether which was a solvent heated at 100° C. The assembly was held at the same temperature for further 3 hours to obtain a vinyl copolymer resin. The resin thus obtained had a heating residue of 60% and a resin acid value of 40.

Production Example 2

Base Resin: Acryl Resin A-2

A production example of a vinyl copolymer resin used in a reference example shall be shown. 53 Parts of styrene, 16 parts of methyl methacrylate, 23 parts of ethyl acrylate, 7 parts of β-hydroxyethyl acrylate, 1 part of methacrylic acid and 0.5 parts of benzoyl peroxide were added dropwise in 4 hours to 67 parts of ethylene glycol monoisopropyl ether which was a solvent heated at 100° C. The assembly was held at the same temperature for further 3 hours to obtain a vinyl copolymer resin. The resin thus obtained had a heating residue of 60%.

Production Example 3

Water-Based Amino Resin B-1

A production example of a water-based amino resin by reaction using β-alanine shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 481 parts of n-butanol, and they were heated up to a refluxing temperature condition and dissolved while stirring.

Next, a 10% aqueous solution of phosphoric acid was added thereto to control a pH of the reaction liquid to 5.0, and then the reaction was continued for 4 hours under a refluxing temperature condition of the reaction liquid. Thereafter, it was subjected to distillation operation under reduced pressure and concentrated until an involatile content reached 80%, and then it was cooled down to 50° C. 46 Parts of β-alanine and 100 parts of water were added to the reaction liquid and stirred at 50° C. for 4 hours to introduce an acid functional group into the amino resin.

The amino resin thus obtained into which the acid functional group was introduced was neutralized with 46 parts of dimethylethanolamine, and then excess water and n-butanol were removed to the outside of the system under reduced pressure so that an involatile content of the water-based amino resin reached 60% while maintaining a temperature of the system at 50° C. or less. The water-based amino resin thus obtained had a weight average molecular weight of 4000.

Production Examples 4 to 6

Water-Based Amino Resins B-2, B-3 and B-4

Water-based amino resins were synthesized by the same operation as in Production Example 3, except that the kind of the amino acid used and an amount of dimethylethanolamine used for neutralization were changed as shown in Table 1.

Production Example 7

Water-Based Amino Resin B-5

A production example of a water-based amino resin by reaction using β-alanine shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 288 parts of methanol, and they were heated up to a refluxing temperature condition and dissolved while stirring.

Next, a 10% aqueous solution of phosphoric acid was added thereto under a refluxing temperature condition of the reaction liquid to control a pH of the reaction liquid to 5.0, and the reaction was continued for 9 hours. Then, it was subjected to distillation operation under reduced pressure and concentrated until an involatile content reached 80%, and then it was cooled down to 50° C. 46 Parts of β-alanine and 100 parts of water were added to the reaction liquid and stirred at 50° C. for 4 hours to introduce an acid functional group into the amino resin.

The amino resin thus obtained into which the acid functional group was introduced was neutralized with 46 parts of dimethylethanolamine, and then excess water and methanol were removed to the outside of the system under reduced pressure so that an involatile content of the water-based amino resin reached 70% while maintaining a temperature of the system at 50° C. or less. The water-based amino resin thus obtained had a weight average molecular weight of 3,200.

Production Example 8

Water-Based Amino Resin B-6

A production example of an amino resin by reaction using β-alanine shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 593 parts of n-butanol, and they were heated up to a refluxing temperature condition and dissolved while stirring.

Next, a 10% aqueous solution of phosphoric acid was added thereto under a refluxing temperature condition of the reaction liquid to control a pH of the reaction liquid to 5.0, and the reaction was continued for 9 hours. Then, it was subjected to distillation operation under reduced pressure and concentrated until an involatile content reached 80%, and then it was cooled down to 50° C. 46 Parts of β-alanine 100 parts of and water were added to the reaction liquid and stirred at 50° C. for 4 hours to introduce an acid functional group into the amino resin.

The amino resin thus obtained into which the acid functional group was introduced was neutralized with 46 parts of dimethylethanolamine, and then excess water and n-butanol were removed to the outside of the system under reduced pressure so that an involatile content of the water-based amino resin reached 70% while maintaining a temperature of the system at 50° C. or less. The water-based amino resin thus obtained had a weight average molecular weight of 1,800.

Production Example 9

Water-Based Amino Resin B-7

A production example of an amino resin by reaction using β-alanine shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 370 parts of n-butanol, and they were heated up to a refluxing temperature condition and dissolved while stirring.

Next, a 10% aqueous solution of phosphoric acid was added thereto under a refluxing temperature condition of the reaction liquid to control a pH of the reaction liquid to 5.0, and the reaction was continued for 9 hours. Then, it was subjected to distillation operation under reduced pressure and concentrated until an involatile content reached 80%, and then it was cooled down to 50° C. 46 Parts of β-alanine and 100 parts of water were added to the reaction liquid and stirred at 50° C. for 4 hours to introduce an acid functional group into the amino resin.

The amino resin thus obtained into which the acid functional group was introduced was neutralized with 46 parts of dimethylethanolamine, and then excess water and n-butanol were removed to the outside of the system under reduced pressure so that an involatile content of the resin reached 70% while maintaining a temperature of the system at 50° C. or less. The water-based amino resin thus obtained had a weight average molecular weight of 6,500.

Production Example 10

Water-Based Amino Resin B-8

A production example of an amino resin by reaction using p-aminobenzoic acid shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 481 parts of n-butanol, and they were heated up to a refluxing temperature condition and dissolved while stirring.

Next, a 10% aqueous solution of phosphoric acid was added thereto under a refluxing temperature condition of the reaction liquid to control a pH of the reaction liquid to 5.0, and the reaction was continued for 9 hours. Then, it was subjected to distillation operation under reduced pressure and concentrated until an involatile content reached 90%, and then it was cooled down to 50° C. 69 Parts of p-aminobenzoic acid, 100 parts of water and 100 parts of ethanol were added to the reaction liquid and stirred at 50° C. for 3 hours to introduce an acid functional group into the amino resin.

The amino resin thus obtained into which the acid functional group was introduced was neutralized with 46 parts of dimethylethanolamine, and then excess water, ethanol and n-butanol were removed to the outside of the system under reduced pressure so that an involatile content of the resin reached 60% while maintaining a temperature of the system at 50° C. or less. The water-based amino resin thus obtained had a weight average molecular weight of 4,000.

Production Example 11

Water-Based Amino Resin B-9

A production example of an amino resin by reaction using p-sulfanilic acid shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 481 parts of n-butanol, and they were heated up to a refluxing temperature condition and dissolved while stirring.

Next, a 10% aqueous solution of phosphoric acid was added thereto under a refluxing temperature condition of the reaction liquid to control a pH of the reaction liquid to 5.0, and the reaction was continued for 9 hours. Then, it was subjected to distillation operation under reduced pressure and concentrated until an involatile content reached 90%, and then it was cooled down to 50° C. 87 Parts of p-aminobenzoic acid, 100 parts of water, 100 parts of ethanol and 46 parts of dimethylethanolamine were added to the reaction liquid and stirred at 50° C. for 3 hours to introduce an acid functional group into the amino resin.

Excess water, ethanol and n-butanol were removed to the outside of the system under reduced pressure so that an involatile content of the obtained amino resin reached 60% while maintaining a temperature of the system at 50° C. or less. The water-based amino resin thus obtained had a weight average molecular weight of 4,100.

Production Example 12

Butylated Amino Resin B-10

A production example of an amino resin used in the comparative examples and the reference example by reaction of melamine with n-butanol shall be shown. A reactor equipped with a thermometer, a stirrer, a reflux cooling tube and a solvent & by-product recovering device was charged with 196 parts of paraformaldehyde (containing 92% of formaldehyde), 126 parts of melamine and 444 parts of n-butanol, and a 10% aqueous solution of phosphoric acid was added thereto while stirring to control a pH of the reaction liquid to 5.0.

Thereafter, the reaction liquid was heated and the reaction was continued for 4 hours under its refluxing temperature condition followed by cooling down to 70° C. A 10% aqueous solution of sodium hydroxide was added to control a pH of the system to 7.0. Further, excess butanol was removed to the outside of the system under reduced pressure so that an involatile content of the amino resin reached 60% while maintaining a temperature of the system at 70° C. or less. The amino resin thus obtained had a weight average molecular weight of 3,900.

The physical properties and the like of the amino resins obtained in the production examples are shown in Table 1 and Table 2.

The water reducibility and the bubble viscosity (one of the control items in the standards of an amino resin) were evaluated or measured in the following manners.

Water reducibility: the sample 1 g was put in a beaker of 100 ml under a condition of 25° C., and 50 g of water was added thereto. The assembly was stirred at 200 rpm by means of a magnetic stirrer and then left standing still for 2 minutes, and the state of water and the sample was visually judged.

○: uniformly dispersed or dissolved
Δ: separated into two phases
X: separated into two phases with precipitation Bubble viscosity: measured according to JIS K5400-4-5-1

TABLE 1

|  | Production Example 3 B-1 | Production Example 4 B-2 | Production Example 5 B-3 | Production Example 6 B-4 | Production Example 7 B-5 | Production Example 8 B-6 | Production Example 9 B-7 |
|---|---|---|---|---|---|---|---|
| Melamine | 126 parts | 126 parts | 126 parts | 126 parts | 126 parts | 126 parts | 126 parts |
| Formaldehyde | 196 parts | 196 parts | 196 parts | 196 parts | 196 parts | 196 parts | 196 parts |
| Butanol | 481 parts | 481 parts | 481 parts | 481 parts |  | 593 parts | 370 parts |
| Methanol |  |  |  |  | 288 parts |  |  |
| β-Alanine | 46 parts | 46 parts | 46 parts |  | 46 parts | 46 parts | 46 parts |
| Glycine |  |  |  | 38 parts |  |  |  |
| Water | 100 parts | 100 parts | 100 parts | 100 parts | 100 parts | 100 parts | 100 parts |
| DMEA | 46 parts | 41 parts | 51 parts | 46 parts | 46 parts | 46 parts | 46 parts |
| Molecular weight | 4,000 | 4,100 | 3,900 | 3,800 | 3,200 | 1,800 | 6,500 |
| Involatile content | 60% | 60% | 60% | 60% | 70% | 60% | 60% |
| Bubble viscosity | Z1 | Z2 | Z1 | Z1 | Z3 | Y | Z4 |
| Water reducibility | ○ | ○ | ○ | ○ | ○ | ○ | ○ |

*DMEA: dimethylethanolamine (used for neutralizing a carboxyl group of the amino resin)

TABLE 2

|  | Production Example 10 B-8 | Production Example 11 B-9 | Production Example 12 B-10 |
|---|---|---|---|
| Melamine | 126 parts | 126 parts | 126 parts |
| Formaldehyde | 196 parts | 196 parts | 196 parts |
| Butanol | 481 parts | 481 parts | 481 parts |
| Methanol |  |  |  |
| p-Aminobenzoic acid | 69 parts |  |  |
| p-Sulfanilic acid |  | 87 parts |  |
| Ethanol | 100 parts | 100 parts |  |
| Water | 100 parts | 100 parts |  |
| DMEA | 46 parts | 46 parts |  |
| Molecular weight | 4,000 | 4,100 | 3,900 |

TABLE 2-continued

|  | Production Example 10 B-8 | Production Example 11 B-9 | Production Example 12 B-10 |
|---|---|---|---|
| Involatile content | 60% | 60% | 60% |
| Bubble viscosity | Z1 | Z2 | Z1 |
| Water reducibility | ○ | ○ | Δ |

*DMEA: dimethylethanolamine (used for neutralizing a carboxyl group of the amino resin)

Example, Comparative Examples and Reference Example

The resins obtained in Production Examples 1 and 2 and Production Examples 3 to 12 were used to prepare water-based thermosetting resin compositions according to blend ratios shown in Table 3. "Cymel 325" (methylated melamine, weight average molecular weight: 1000) manufactured by Nihon Cytec Industries Inc. was used as an amino resin B-11, which was designated as an representative example of low molecular amino resins.

Next, the water-based thermosetting resin compositions obtained in the examples and the comparative examples were diluted with water, and the thermosetting resin composition obtained in the reference example was diluted with an organic solvent (xylene) to control time of seconds at which a whole amount of a solution fell down from a hole of a cup at 25° C. in a Ford cup test for measuring a viscosity at 15 seconds, whereby water-based paints and a paint diluted with the organic solvent were obtained. The Ford cup viscosity measurement was conducted in accordance with JIS K5400-4-5-4.

Thereafter, the paints described above were coated on a zinc phosphate-treated steel plate by means of a spray so that a thickness of coated films after baking was 30 μm, and they were heated at a temperature of 140° C. for a baking time of 30 minutes to prepare coated plates. The results of evaluating the physical properties of the formed coated films and the paints are shown in Table 4.

The physical properties were evaluated in the following manners.

Appearance: visually judged.

⊚: no problem on either smoothness or gloss

○: weak whitening or weak orange peel

X: whitening or orange peel

Solvent resistance: shown by a change in the coated film when rubbed with a gauze impregnated with methyl ethyl ketone while reciprocating 50 times.

TABLE 3

|  |  | Example 1 | Example 2 | Example 3 | Example 4 | Example 5 | Example 6 |
|---|---|---|---|---|---|---|---|
| Base resin | A-1 | 70 | 70 | 70 | 70 | 70 | 70 |
|  | A-2 |  |  |  |  |  |  |
| Amino resin | B-1 | 30 |  |  |  |  |  |
|  | B-2 |  | 30 |  |  |  |  |
|  | B-3 |  |  | 30 |  |  |  |
|  | B-4 |  |  |  | 30 |  |  |
|  | B-5 |  |  |  |  | 30 |  |
|  | B-6 |  |  |  |  |  | 30 |
|  | B-7 |  |  |  |  |  |  |
|  | B-8 |  |  |  |  |  |  |
|  | B-9 |  |  |  |  |  |  |
|  | B-10 |  |  |  |  |  |  |
|  | B-11 |  |  |  |  |  |  |
| Basic compound | DMEA* | Equivalent neutralization | Equivalent neutralization | Equivalent neutralization | Equivalent neutralization | Equivalent neutralization | Equivalent neutralization |

|  |  | Example 7 | Example 8 | Example 9 | Comparative example 1 | Comparative example 2 | Reference example |
|---|---|---|---|---|---|---|---|
| Base resin | A-1 | 70 | 70 | 70 | 70 | 70 |  |
|  | A-2 |  |  |  |  |  | 70 |
| Amino resin | B-1 |  |  |  |  |  |  |
|  | B-2 |  |  |  |  |  |  |
|  | B-3 |  |  |  |  |  |  |
|  | B-4 |  |  |  |  |  |  |
|  | B-5 |  |  |  |  |  |  |
|  | B-6 |  |  |  |  |  |  |
|  | B-7 | 30 |  |  |  |  |  |
|  | B-8 |  | 30 |  |  |  |  |
|  | B-9 |  |  | 30 |  |  |  |
|  | B-10 |  |  |  | 30 |  | 30 |
|  | B-11 |  |  |  |  | 30 |  |
| Basic compound | DMEA* | Equivalent neutralization | Equivalent neutralization | Equivalent neutralization | Equivalent neutralization | Equivalent neutralization |  |

*DMEA: dimethylethanolamine (used for neutralizing a carboxyl group of the base resin)

(Judging Criteria)

⊚: no change

○: whitened

Δ: the coated film was whitened and abraded

X: the ground under the coated film could be seen

Erichsen: JIS K-5400-8-2

Dupont: measured at a load of 300 kg by means of an impact tool having an end of ½ inch R according to JIS K-5400-8-3 Dupont type Pencil hardness: JIS K-5400-8-4

Warm water resistance: the coated plate was dipped in warm water of 60° C. for 50 hours, whereafter a change in the coated film was observed.

(Judging Criteria)
◎: no blister was observed on the coated surface
○: one or two blisters were observed on the coated surface but no practical problems
Δ: blisters were observed partly on the coated surface and difficult to use
X: blisters were observed on the whole area of the coated surface Stability: 30 g of the paint was put in a glass tube of 50 ml and left standing at 40° C. for 60 hours, and then a change in the molecular weight or a change in the appearance was evaluated.

(Judging Criteria: Paint)
○: no change
X: separated and clouded

Cross cut adhesion: evaluated by the number of the adhered parts after peeling a tape according to JIS K-5400-8-5-2

TABLE 4

| | Appearance | Pencil hardness | Solvent resistance | Dupont | Erichsen | Crosscut adhesion | Warm water resistance | Stability (paint) |
|---|---|---|---|---|---|---|---|---|
| Example 1 | ◎ | 2H | ◎ | 40 | 5.9 | 100/100 | ◎ | ○ |
| Example 1 | ◎ | 2H | ◎ | 45 | 5.4 | 100/100 | ◎ | ○ |
| Example 3 | ◎ | 2H | ◎ | 40 | 5.6 | 100/100 | ◎ | ○ |
| Example 4 | ◎ | 2H | ◎ | 40 | 5.3 | 100/100 | ◎ | ○ |
| Example 5 | ◎ | 2H | ◎ | 35 | 5.1 | 100/100 | ◎ | ○ |
| Example 6 | ◎ | 2H | ◎ | 50 | 6.2 | 100/100 | ◎ | ○ |
| Example 7 | ◎ | 2H | ◎ | 35 | 4.9 | 100/100 | ◎ | ○ |
| Example 8 | ◎ | 2H | ◎ | 40 | 6.0 | 100/100 | ◎ | ○ |
| Example 9 | ◎ | 2H | ◎ | 45 | 5.8 | 100/100 | ◎ | ○ |
| Comparative Example 1 | | | the paint was separated and could not be evaluated | | | | | X |
| Comparative Example 2 | ◎ | 2H | ◎ | 35 | 3.5 | 90/100 | ○ | ○ |
| Reference Example | ◎ | 2H | ◎ | 45 | 5.2 | 100/100 | ◎ | ○ |

As shown in Table 4, the water-based paints obtained from the water-based thermosetting resin compositions obtained in the examples had excellent performances equal to those of the conventional paint (reference example) used after diluted with an organic solvent.

The invention claimed is:

1. A water-based amino resin which is a condensation product of an amino compound (a) having no acid functional group, an amino compound having an acid functional group or an amide compound having an acid functional group (b), formaldehyde (c) and an alcohol (d),
wherein an acid functional group originating in the compound (b) is neutralized with a basic compound (e).

2. The water-based amino resin as described in claim 1, wherein a weight average molecular weight relative to polystyrene standards measured by GPC (gel permeation chromatography) is 1200 to 10000.

3. A production process for the water-based amino resin as described in claim 1,
wherein an amino compound (a) having no acid functional group, an amino compound having an acid functional group or an amide compound having an acid functional group (b), formaldehyde (c) and an alcohol (d) are condensed under the presence of water (g), and
an acid functional group originating in the compound (b) in a product (I) obtained by the above condensation is neutralized with a basic compound (e).

4. The production process for the water-based amino resin as described in claim 3,
wherein the product (I) is obtained by condensing the compound (a), the formaldehyde (c) and the alcohol (d) and condensing a product (II) obtained by the above condensation with the compound (b) under the presence of water (g).

5. The production process for the water-based amino resin as described in claim 4,
wherein the product (II) is condensed with the compound (b) at a reaction temperature of 50 to 60° C. under the presence of an alcohol (f) and water (g).

6. A production process for the water-based amino resin as described in claim 1,
wherein an amino compound (a) having no acid functional group, a compound (h) obtained by neutralizing an amino compound having an acid functional group or an amide compound having an acid functional group (b) with a basic compound (e), formaldehyde (c) and an alcohol (d) is condensed under the presence of water (g).

7. A production process for the water-based amino resin as described in claim 1,
wherein amino compound (a) having no acid functional group), formaldehyde (c) and an alcohol (d) is condensed, and
a product (III) obtained by the above condensation is condensed with a compound (h) obtained by neutralizing an amino compound having an acid functional group or an amide compound having an acid functional group (b) with a basic compound (e) under the presence of water (g).

8. The production process for the water-based amino resin as described in claim 7,
wherein the product (III) is condensed with the compound (h) at a reaction temperature of 50 to 60° C. under the presence of an alcohol (f) and water (g).

9. A water-based thermosetting resin composition comprising the water-based amino resin as described in claim 1.

10. A paint comprising the water-based thermosetting resin composition as described in claim 9.

11. A coating material comprising the water-based thermosetting resin composition as described in claim 9.

* * * * *